United States Patent [19]

McGuffin et al.

[11] Patent Number: 4,728,281
[45] Date of Patent: Mar. 1, 1988

[54] KEY CONTROLLED BEVERAGE MAKING DEVICE

[76] Inventors: George B. McGuffin, P.O. Box 1914; Harold L. Nichols, P.O. Box 1503; Gilbert E. Black, P.O. Box 1581, all of Morristown, Tenn. 37814

[21] Appl. No.: 887,202

[22] Filed: Jul. 21, 1986

[51] Int. Cl.⁴ .......................... A23F 5/00; A47J 31/00
[52] U.S. Cl. ...................................... 426/433; 99/279; 312/215
[58] Field of Search .............. 99/279, 295, 306, 280, 99/281, 282, 283; 312/215; 426/433; 70/410

[56] References Cited

U.S. PATENT DOCUMENTS

| | | | |
|---|---|---|---|
| 3,338,365 | 8/1967 | Hoffberger | 70/410 |
| 3,366,034 | 1/1968 | Karlen | 99/295 |
| 3,385,201 | 5/1968 | Martin | 99/295 |
| 3,716,697 | 2/1973 | Weir . | |
| 4,120,452 | 10/1978 | Kimura . | |
| 4,179,064 | 12/1979 | Yoshioka et al. . | |
| 4,237,536 | 12/1980 | Enelow . | |
| 4,402,201 | 9/1983 | Nokes | 70/410 |
| 4,478,139 | 10/1984 | Zimmerman | 99/280 |
| 4,553,211 | 11/1985 | Kawasaki et al. . | |

Primary Examiner—Robert W. Jenkins
Attorney, Agent, or Firm—Fleit, Jacobson, Cohn & Price

[57] ABSTRACT

A beverage making device and a method of serving beverages to guests in a motel room, hotel room or similar facilities. A one-time use key is provided to control operation of the beverage making device and a disposable cartridge containing infusion material such as coffee, tea and the like is supplied to the guests along with the key by the desk clerk or other attendant when the guests register in the motel or hotel so that a beverage making apparatus in the room occupied by the guests can be operated only once but at any time by the guests without the attention of any motel or hotel personnel to enable the guests to make a beverage when desired.

8 Claims, 2 Drawing Figures

KEY CONTROLLED BEVERAGE MAKING DEVICE

BACKGROUND OF THE INVENTION

1. Field of the Invention

The present invention generally relates to a beverage making device and a method of serving beverages to guests in a motel room, hotel room or similar facilities. A one-time use key is provided to control operation of the beverage making device and a disposable cartridge containing infusion material such as coffee, tea and the like is supplied to the guests along with the key by the desk clerk or other attendant when the guests register in the motel or hotel so that a beverage making apparatus in the room occupied by the guests can be operated only once but at any time by the guests without the attention of any motel or hotel personnel to enable the guests to make a beverage when desired.

2. Information Disclosure Statement

Most establishments which cater to travelers have various arrangements for enabling beverages, food items and the like to be supplied to guests in their room. For example, most motels, hotels and similar establishments have room service and many establishments of this type have restaurant services including carry-out services. However, delays are encountered frequently when requesting room service and it is inconvenient and time consuming for a guest to leave their room and obtain items from a carry-out service and return to the room. There have also been developed rather sophistiicated devices and systems by which a room guest can obtain a selected beverage from a mechanism installed in the room with the cost of such beverage being automatically added to the bill for the particular room which obtains the beverage. However, there is not available any relatively simple device which can be quickly and easily installed without extensive electrical controls and the like and which can be easily used by guests so that a beverage can be made by the guests in a quick, efficient and sanitary manner at a relatively low cost.

SUMMARY OF THE INVENTION

An object of the present invention is to provide a key controlled beverage making device and method of serving beverages to guests in motel rooms, hotel rooms and the like which includes a beverage brewing device provided with a control in the form of a one-time use key and a disposable cartridge of infusion material which may be supplied to the guests when registering at the establishment so that the guests then may quickly and easily make a desired beverage at the time it is desired.

Another object of the invention is to provide a beverage making device in accordance with the preceding object in which the beverage making device can be quickly and easily mounted on a horizontal or vertical surface in a guest room with the device being constructed so that a guest can quickly and easily utilize the device to make a beverage without requiring a great expenditure of time and without having to read and understand elaborate instructions thereby rendering the device and method feasible for installation in various establishments which cater to travelers and the like.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE DISCLOSED EMBODIMENT

Figure 1:
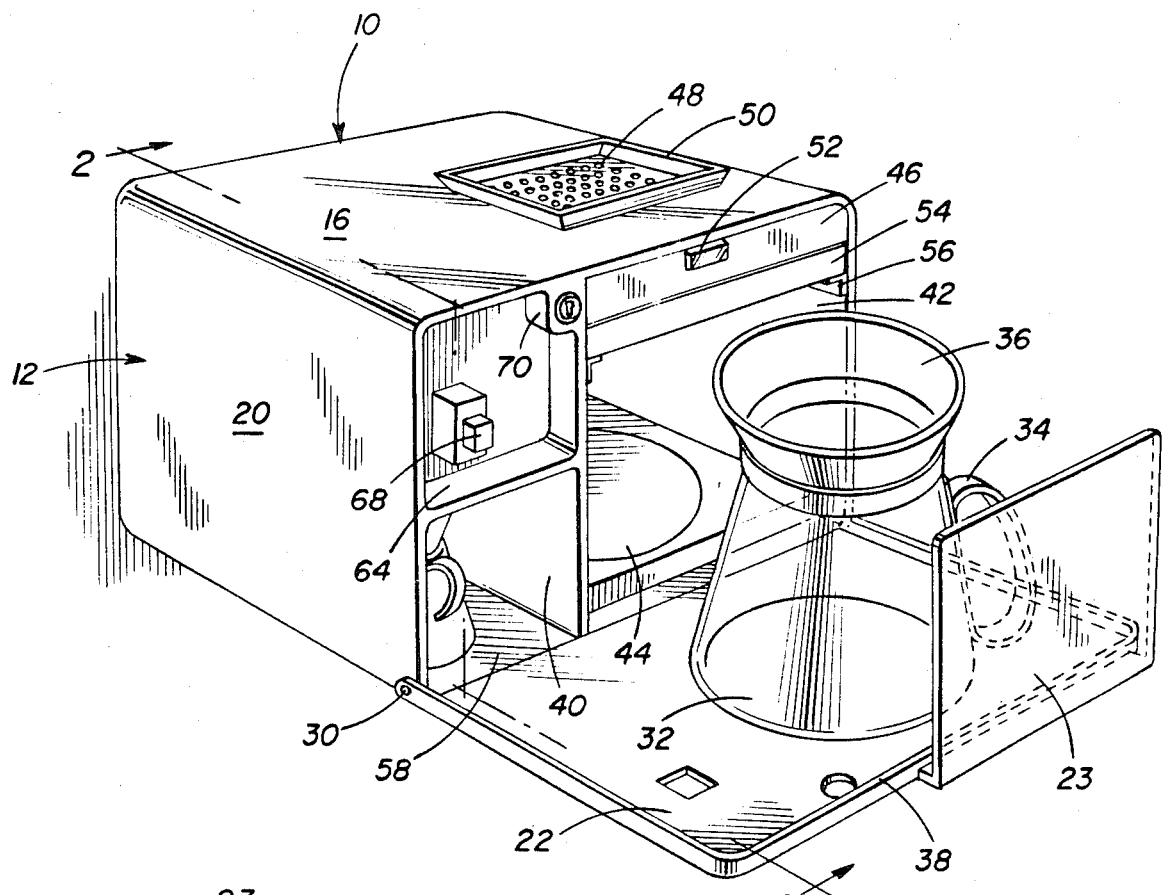
FIG. 1 is a perspective view of the beverage making device of the present invention.
Figure 2:
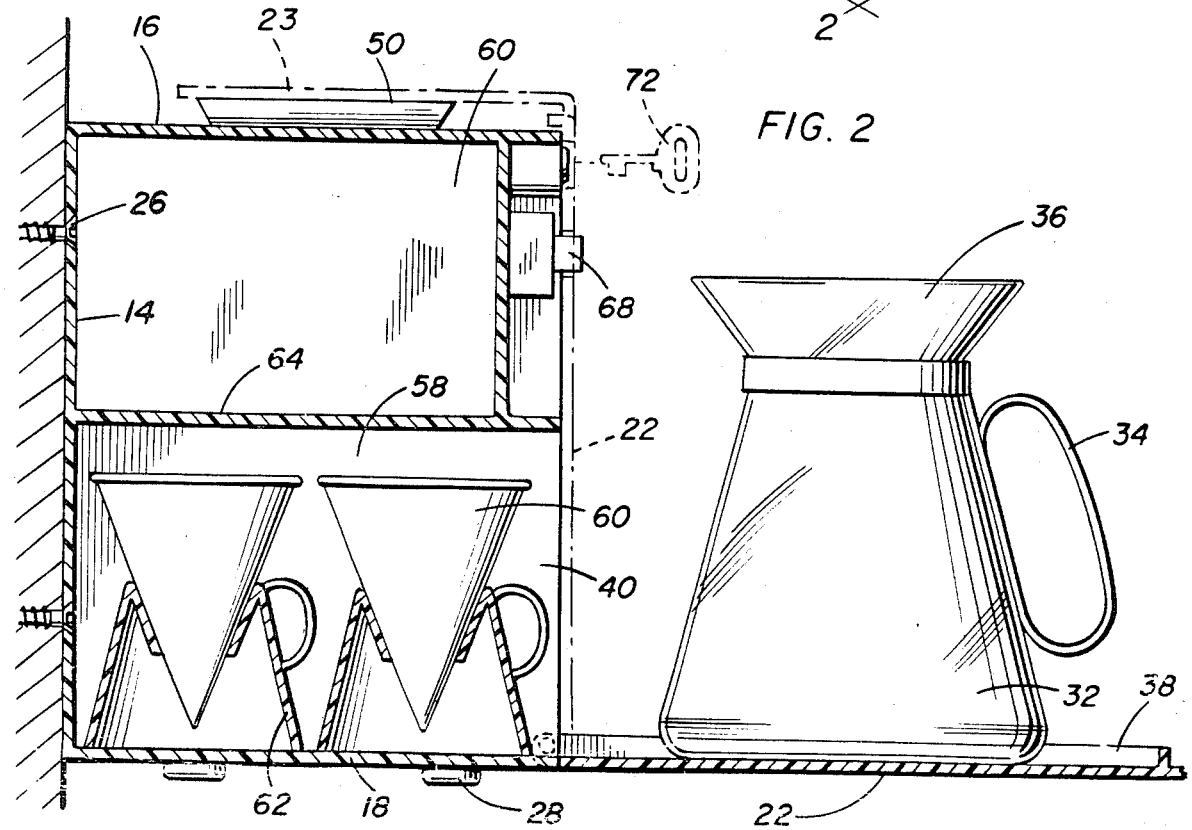
FIG. 2 is a vertical sectional view taken substantially upon a plane passing along section line 2—2 on FIG. 1 illustrating some of the structural features thereof.

While one embodiment of the invention has been illustrated in the drawings and described in detail hereinafter, it is pointed out that various alternative and optional arrangements are available which use the same principles of operation.

As illustrated, the beverage making device 10 includes a housing or cabinet 12 which may be generally rectangular in configuration with the housing including a rear wall 14, top wall 16, bottom wall 18, sidewalls 20 and a front door or wall 22 which, when closed, forms a closure for the open front of the housing 12. The rear wall 14 is secured to a vertical wall 24 by fasteners 26. The bottom wall 18 may be provided with supporting feet, pads or legs 28 by which the housing may be supported on a horizontal surface in lieu of being supported from the vertical surface 24. If desired, screw fasteners or similar fasteners may be used to secure the bottom wall 18 to a supporting surface in order to securely retain the device 10 in place in a guest room of a motel, hotel or the like. The front wall or door 22 is hingedly supported at the lower edge thereof by a hinge structure 30 that enables the front wall or door 22 to hinge downwardly from a vertically closed position to a generally horizontal position as illustrated in the drawings at which time the front wall or door 22 forms a supporting shelf or service tray for a beverage container 32 such as those used in conventional coffee brewing devices which are normally provided with a handle 34 and pouring spout or lip 36. The front door or wall 22 is provided with a peripheral flange 38 which extends upwardly when the door 22 is in horizontal position to form a retaining lip for the container 32 in order to retain it in position on the tray formed by the horizontal closure door 22. Also, the housing or cabinet 12 includes a vertical partition wall 40 which defines a space 42 for receiving the container 32 with the space 42 including a heating or warming element 44 in the bottom thereof on which the container can be placed. In the upper end of the space or compartment 42, a water tank and heating element 46 is mounted with the upper wall 16 including a perforated area 48 which enables water to be poured into the water tank for heating by the heating element with the perforated area 48 being surrounded by an upwardly and outwardly inclined lip or flange 50. Also, an indicator light 52 may be provided in the front of the water tank or at any other suitable location to indicate operation of the brewing unit.

Positioned immediately below the water tank and heating element 46 is an insertable, removable and disposable cartridge 54 which may be supported by suitable flanges 56 that enables the cartridge 54 to be slid inwardly and outwardly in immediately underlying relation to the water tank and heating element so that hot water discharged from the water tank will pass through the cartridge and the infusion material therein so that coffee or other beverage formed by the water passing through the infusion material will be deposited into the container 32. The disposable cartridge 54 includes a predetermined quantity of infusion material sufficient to produce a quantity of beverage that is desired. The disposable cartridge 54 also includes a filter structure to preclude the infusion granular material from passing into the container 32 with the heated water which passes through the infusion material. Also, the cartridge may be constructed with a pull tab handle or other facility to enable it to be easily inserted and removed and may include a removable wrapper to maintain sterile conditions until the wrapper is removed immediately prior to insertion of the cartridge into the housing 12. The specific construction of the water tank and heating element as well as the perforated area 48 and indicator light 52 are conventional components employed in various types of coffee making devices. The cartridge 54, in effect, replaces the conventionally employed perforated basket and filter which receives the infusion material such as ground coffee or the like and the container 32 and the warming element 44 are also conventional components. The association of the cartridge 54 with the water tank and heating element and with the container 32 is exactly the same as that employed in coffee making devices which are presently available inasmuch as the heated water passes through the cartridge 54 into the container 32 with the infusion material in the cartridge 54 imparting the desired flavor characteristics to the water before it enters the container thus forming a desired beverage. The container 32 is normally left on the warming element 44 but may be temporarily supported on the tray, shelf or door 22 when desired. The housing 12 is also provided with a lower compartment or space 58 on the opposite side of the partition 40 which may receive disposable cups 60 and handled cup holders 62 with this compartment normally receiving at least two such cups and cup holders. The compartment 58 is divided by a horizontal partition 64 which forms a compartment 66 for electrical wiring, controls, and the like including a switch 68 which may be the push type which must be depressed in order to start the brewing cycle. Also, a key operated control device 70 is mounted in the compartment 66 and may be incorporated into the partition 40 or otherwise incorporated into housing 12 with a break-away key 72 being provided so that when the key 72 is inserted into the key control 70 and the key control is operated by the key 72, the key 72 will be broken thereby providing a one-time use key. By the use of this type of structure, after the cartridge has been inserted, the key is used to activate the key control 70 thus conditioning the coffee maker so that it can brew coffee or other beverage with the user pouring in a predetermined quantity of water from the container 32 into the perforated area 48 with the push switch 64 being depressed either before or after the water is poured in. The push switch 64 will not activate the heating elements in the water tank or warming element 44 until such time as the key control 70 has been activated thus requiring use of the key 72 in order to enable activation of the beverage making device.

As an alternative to the cartridge 54 being mounted on the housing, it could also be mounted in the open upper end of the container 32 with the cartridge being shaped to be nested easily into the container 32. Thus, after the container 32 has been used to pour water into the perforated area 48, the cartridge is then placed in the upper end of the container and the container moved into the compartment 42 onto the warming tray 44 so that hot water discharged from the water tank 46 will pass through the cartridge so that the infusion material in the cartridge will coact with the water to form the desired beverage.

The beverage making device may be utilized for various beverages such as coffee, tea and the like and may also be used with other products which can combine hot water and flavoring material such as soups and other liquids. The number of serving cups may obviously be varied and the warming element may be omitted in some instances but it is desirable for the warming element to be used in order to maintain the beverage warm for a desired period of time. The cartridge is disposable and the mounting can be varied depending upon installational requirements. Various types of locking devices utilizing a break-away key or other access arrangements may be provided and sanitation security may be provided by the key control retaining the front door in closed position with the front door including an optional projecting flange (shown at 23 in broken lines in the drawings) which overlies and protects the perforated area 48 so that when the key 72 is inserted into the key control 70, the brewing mechanism will not only be conditioned for brewing but also the door 22 can be opened and access is then available to the perforated area 48. This retains the entire assembly including the container 32 in a sanitary condition until it is ready for use. Cartridge 54 can be a one-use disposable unit when used as a guest sale or could be a standard filter and coffee package arrangement when used as a guest amenity. Alternatively, a slidable or pivotal closure plate may be provided on housing top wall 16 constructed in such a manner to close and cover the area 48 when door 22 is closed and automatically moved to an open position when door 22 is opened. The brewing apparatus includes timed control and if desired, the brewing apparatus may be supplied electrical energy through a special circuit so that personnel at the registration desk can activate the circuit to the beverage making device during only certain time periods. The container 32 can be replaced by personnel and the coffee cup supply may also be replenished by personnel and if desired, the container may be a disposable structure that is collapsible or foldable so that it can be provided in a collapsed state with the cartridge incorporated in the mouth thereof and wrapped in a sanitary wrapper so that the guests can remove the wrapper, expand the container into a shape forming a self-sustaining container with the structure then being used as described hereinbefore. When a disposable pot or container 32 is used, it can be constructed of various economical material capable of maintaining proper serving temperature. The heating or warming element 44 may be omitted if the pot 32 is made of a material incapable of withstanding externally applied heat. If the pot 32 will tolerate external heat, the heating element 44 maintains proper serving temperature. In some instances, the prepackaged cartridge may also include water, such as distilled water, pure spring water and the like if desired by a guest.

As another alternative to using a cartridge, a package of coffee or other infusion material together with a filter may be placed in the housing 12 which will be provided with a conventional perforated basket to receive the filter and infusion material so that that the one-time use key will provide access to these components in order to enable a beverage to be made. The used filter and infusion material may be removed and the device cleaned and provided with a new filter and package of infusion material by personnel when cleaning the room. This type of assembly may also be used if guests are to be provided with complimentary coffee in which event the one-time use key arrangement would be omitted.

Inasmuch as most guests are familiar with coffee making devices of a similar type which use a perforated basket and filter which receives the granular coffee or the like and this apparatus utilizes a similar association of components, the device can be readily and effectively used without careful review of elaborate instructions thereby rendering the device effective for use in guest rooms with the cost of the device being relatively small. Each guest may obtain a beverage at any time desired by merely purchasing a key and disposable cartridge from the registration clerk or other personnel.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A beverage making device for guest rooms in a facility catering to travelers comprising a housing incorporating a beverage making device and container, disposable cartridge means associated with the container and beverage making device by which water passing through the beverage making device, cartridge means and into the container will produce a beverage and means controlling operation of the beverage making device to enable a guest to make only a single quantity of beverage commensurate with the quantity of beverage that can be made by using the cartridge means, said beverage making device including a water tank with external access means, a heating element for heating the water and discharging it into the container through said cartridge means, said means enabling only a single quantity of beverage to be made including a key control and a one-time use key for operating the key control so that when the key control is operated, the key is destroyed to prevent subsequent use.

2. The structure as defined in claim 1 wherein said housing includes an openable front wall to enable insertion and removal of the cartridge means and container, said key control retaining said front wall closed until actuated by said one-time use key thereby preventing access to the interior of the housing.

3. The structure as defined in claim 2 wherein said housing includes means supporting said cartridge means below said water tank and heating element.

4. The structure as defined in claim 3 wherein said housing includes a storage area for cups from which a beverage can be consumed.

5. The structure as defined in claim 4 wherein said housing includes an indicator light for indicating operation of the device and a manually operated switch to initiate a beverage making cycle.

6. The structure as defined in claim 1 wherein said housing includes an external access opening enabling water to be supplied to the water tank and means closing said external access opening until the device is put into operation by said controlling means.

7. A beverage making apparatus comprising beverage making equipment and materials, means preventing access to said equipment and materials, and one-time use means for operating said means preventing access to enable one-time access to said beverage making equipment and materials for making a beverage, said one-time use means being rendered inoperable by a single operation of said means preventing access thereby preventing subsequent use of said one-time use means to provide access to said equipment and materials.

8. The method of limiting the use of beverage making apparatus to a single cycle of operation to make a single quantity of beverage consisting of the steps of conditioning the apparatus for a single cycle of use to make a single quantity of beverage, and providing a user with means enabling one-time use of the apparatus to make a quantity of beverage with said means being rendered inoperative to enable subsequent use in response to said one-time use.

* * * * *